Sept. 26, 1933.  H. A. HARMAN  1,927,935
AUTOMATIC STEERSMAN
Filed July 24, 1930   8 Sheets-Sheet 1

FIG. 1.

INVENTOR
Hyde A. Harman
BY Harold Dodd
ATTORNEY

Sept. 26, 1933. H. A. HARMAN 1,927,935
AUTOMATIC STEERSMAN
Filed July 24, 1930 8 Sheets-Sheet 2

FIG. 2.

INVENTOR
Hyde A. Harman.
BY
Harold Dodd.
ATTORNEY

Sept. 26, 1933.                H. A. HARMAN                 1,927,935
                            AUTOMATIC STEERSMAN
                           Filed July 24, 1930         8 Sheets-Sheet 4

FIG. 5

INVENTOR
Hyde A. Harman.
BY
Harold Dodd.
ATTORNEY

FIG. 6

Sept. 26, 1933.   H. A. HARMAN   1,927,935
AUTOMATIC STEERSMAN
Filed July 24, 1930   8 Sheets-Sheet 6

FIG. 7.

INVENTOR
Hyde A. Harman.
BY
Harold Dodd.
ATTORNEY

Patented Sept. 26, 1933

1,927,935

UNITED STATES PATENT OFFICE 1,927,935

AUTOMATIC STEERSMAN

Hyde A. Harman, United States Navy, assignor of one-fifth to Evander W. Sylvester, Alexandria, La.

Application July 24, 1930. Serial No. 470,431

24 Claims. (Cl. 172—282)

(Granted under the act of March 3, 1883, as amended April 30, 1928; 370 O. G. 757)

My invention relates broadly to improvements in an automatic steersman and more particularly to a device for steering a vessel or dirigible on a set course automatically and continuously.

An object of my invention is to provide a device of light construction that can be easily fitted for use with the electric steering gears of a vessel or dirigible.

Another object of my invention is to provide a device that automatically steers a vessel or dirigible on a set course more accurately than the manual control of steering gears thereby partially relieving the helmsman for other duties.

A further object of my invention is to provide a device for accurately steering a vessel or dirigible when power is being supplied to only one propeller of a twin screw installation or when power is supplied to multiple propellers on one side of the vessel or dirigible my device compensates in the steering apparatus for the lack of power on the opposite side of the vessel or dirigible.

Still a further object of my invention is to provide an automatic steersman that is small and easy to handle so that it can be inserted at various points of the vessel or dirigible thereby making the device a portable steersman.

It is another object of my invention to provide an automatic steersman that permits a definite angle of yaw to the port side and a definite angle of yaw to the starboard side. The angle of yaw to either the port side or the starboard side can be varied so that the set angle of yaw to port does not have to correspond to the angle set for the starboard yaw.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which.

Figure 1:
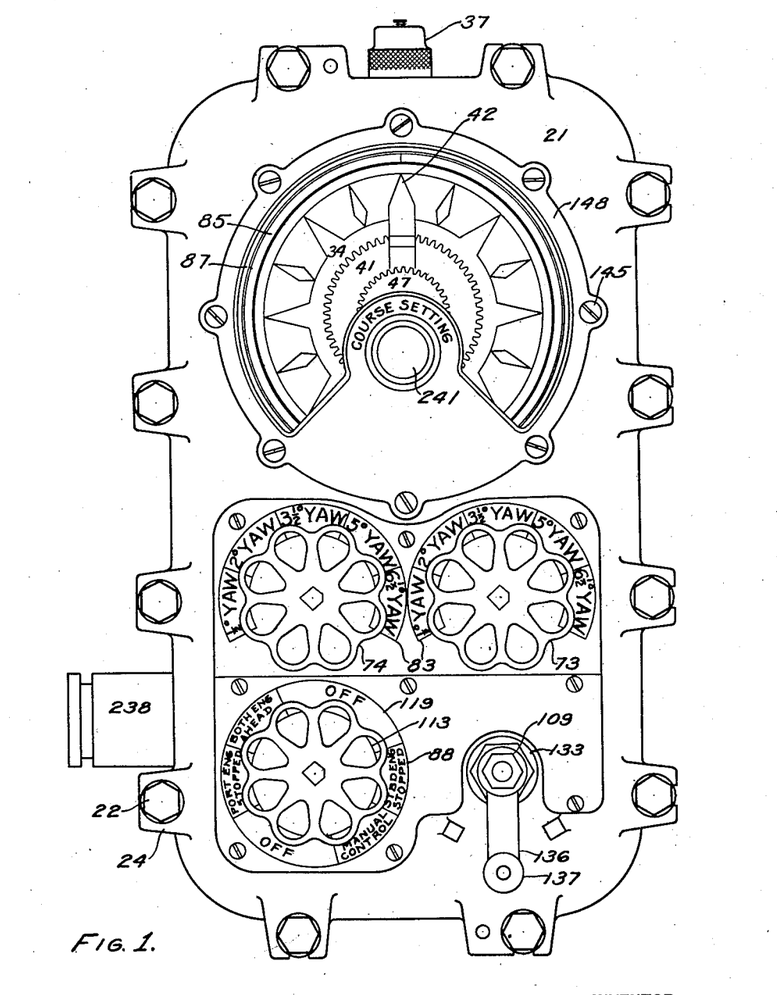
Figure 1 is a plan view of the automatic steersman of my improved device.
Figure 2:
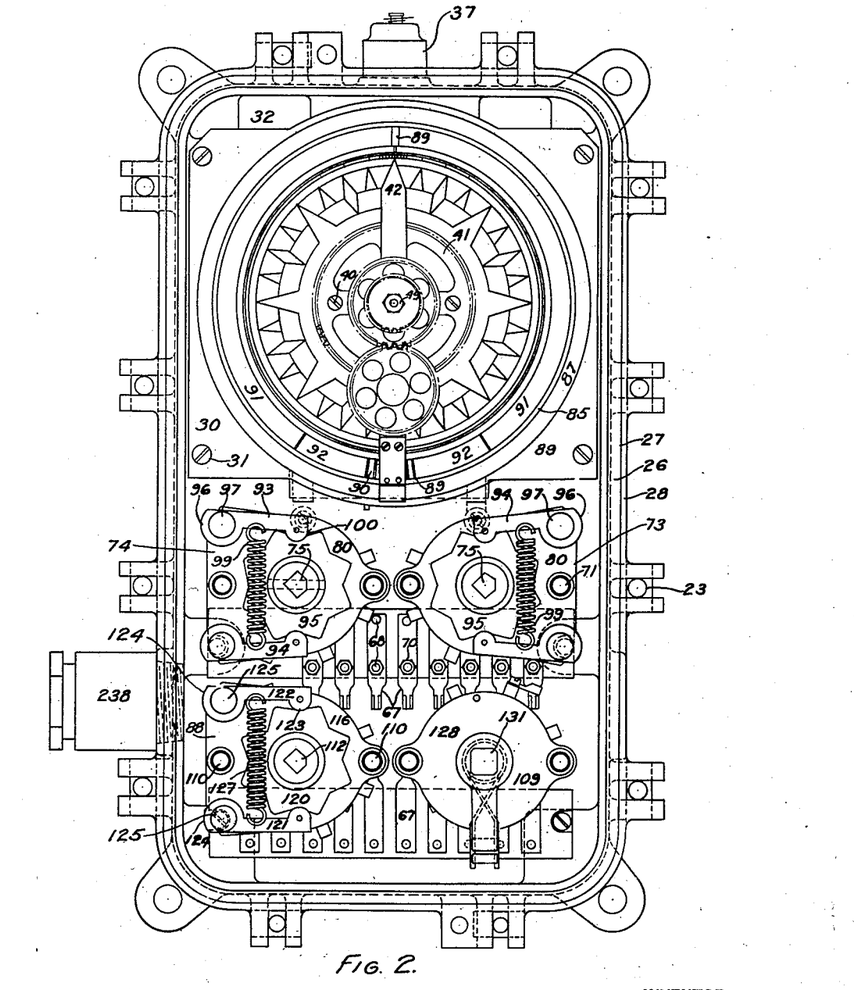
Figure 2 is a plan view of the automatic steersman of my improved device with the cover removed.
Figure 3:
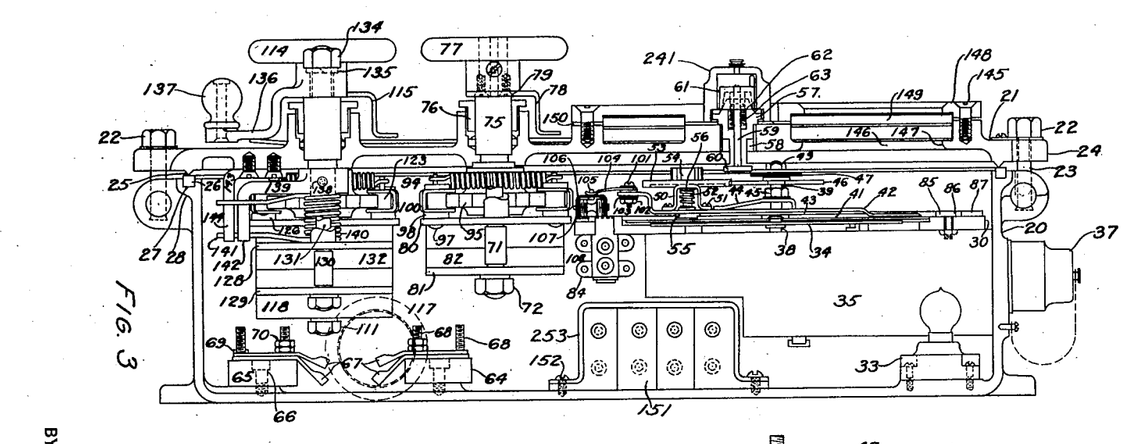
Figure 3 is a longitudinal sectional view through the steersman of my improved device.
Figure 4:
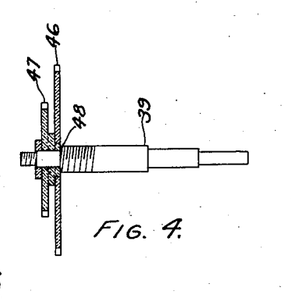
Figure 4 is a detail view partly in section of a portion of my invention.
Figure 5:
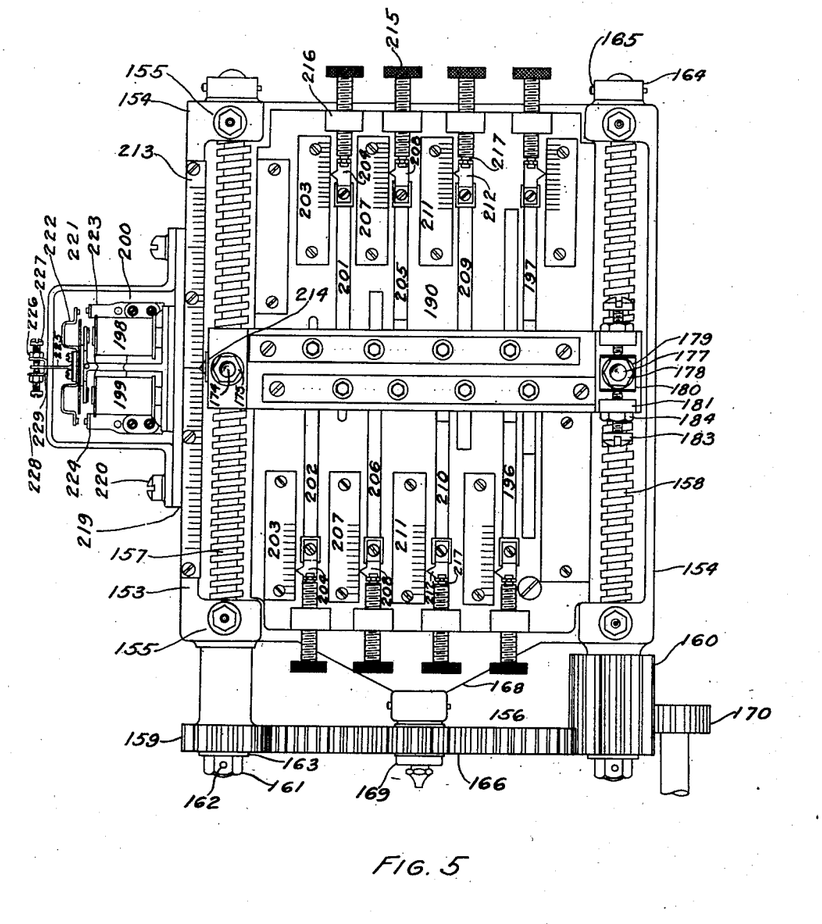
Figure 5 is a plan view of the rudder angle limit panel of my improved device.
Figure 6:
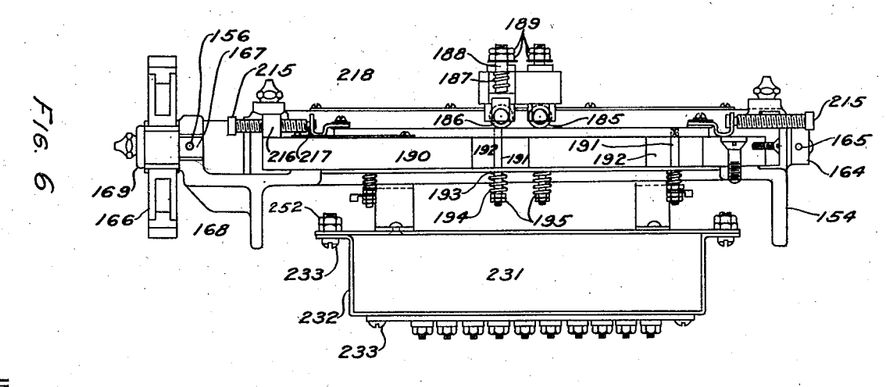
Figure 6 is a sectional view of the rudder angle limit panel taken on line 6—6 of Figure 5.
Figure 7:
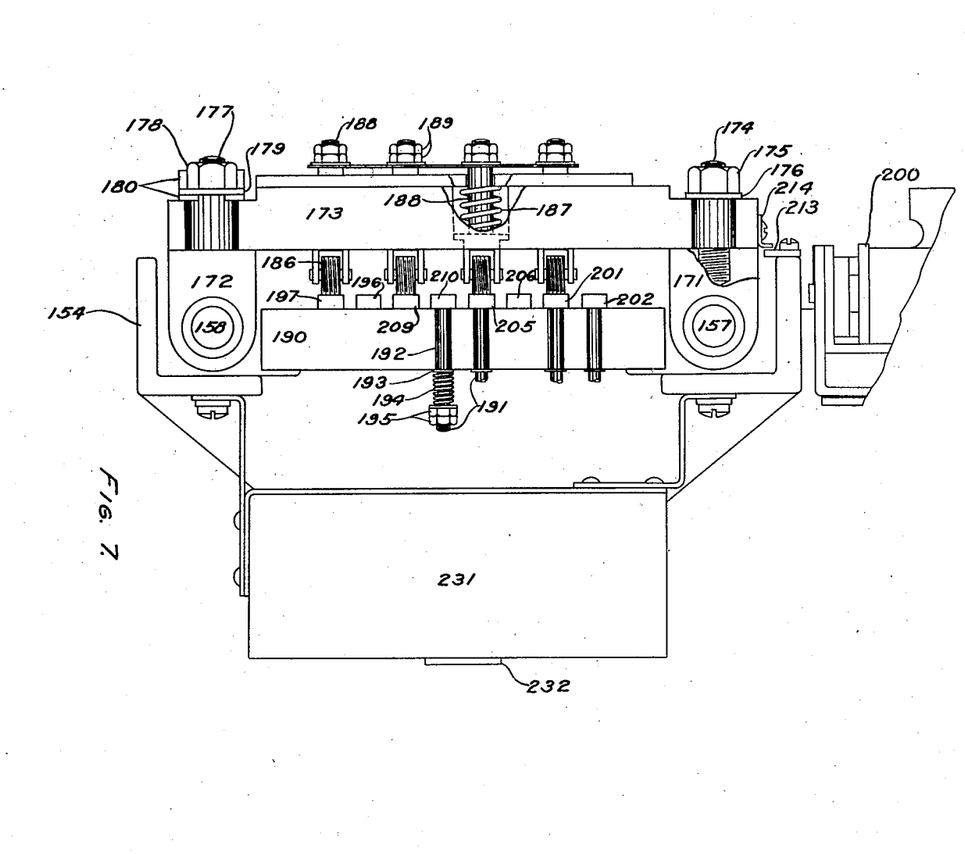
Figure 7 is a sectional view showing a portion of the rudder angle limit panel of my improved device in detail.
Figure 8:
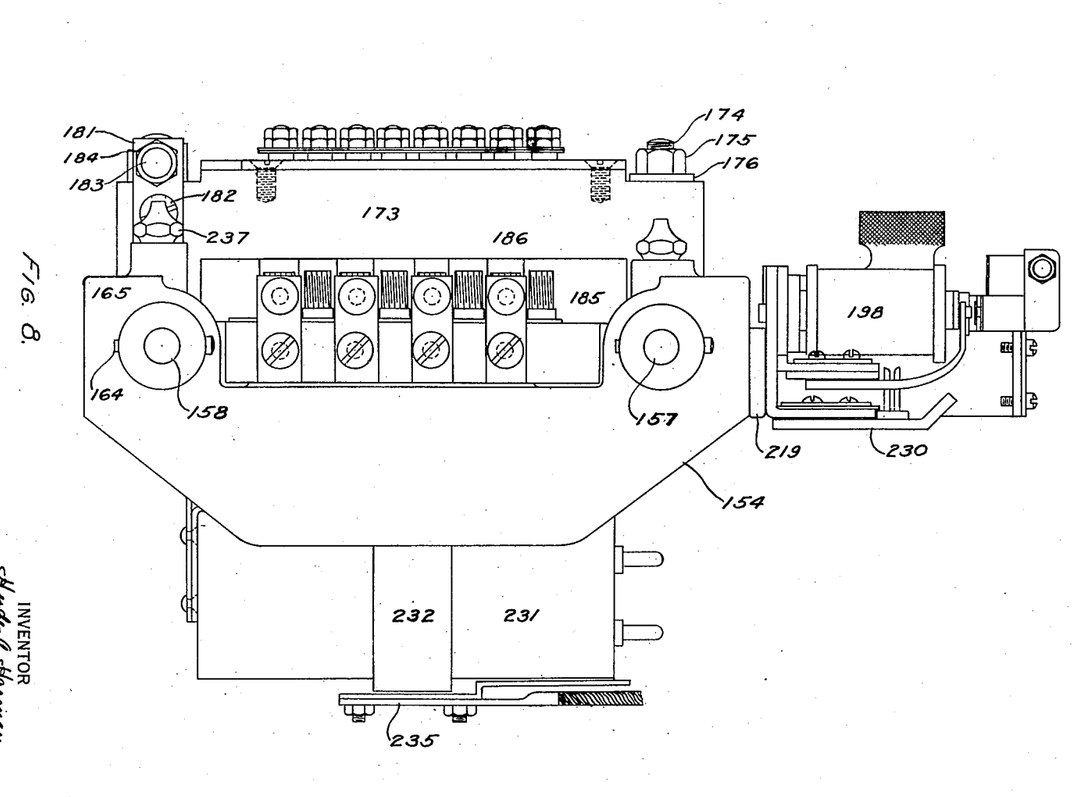
Figure 8 is an end view of the rudder angle limit panel of my improved device.
Figure 9:
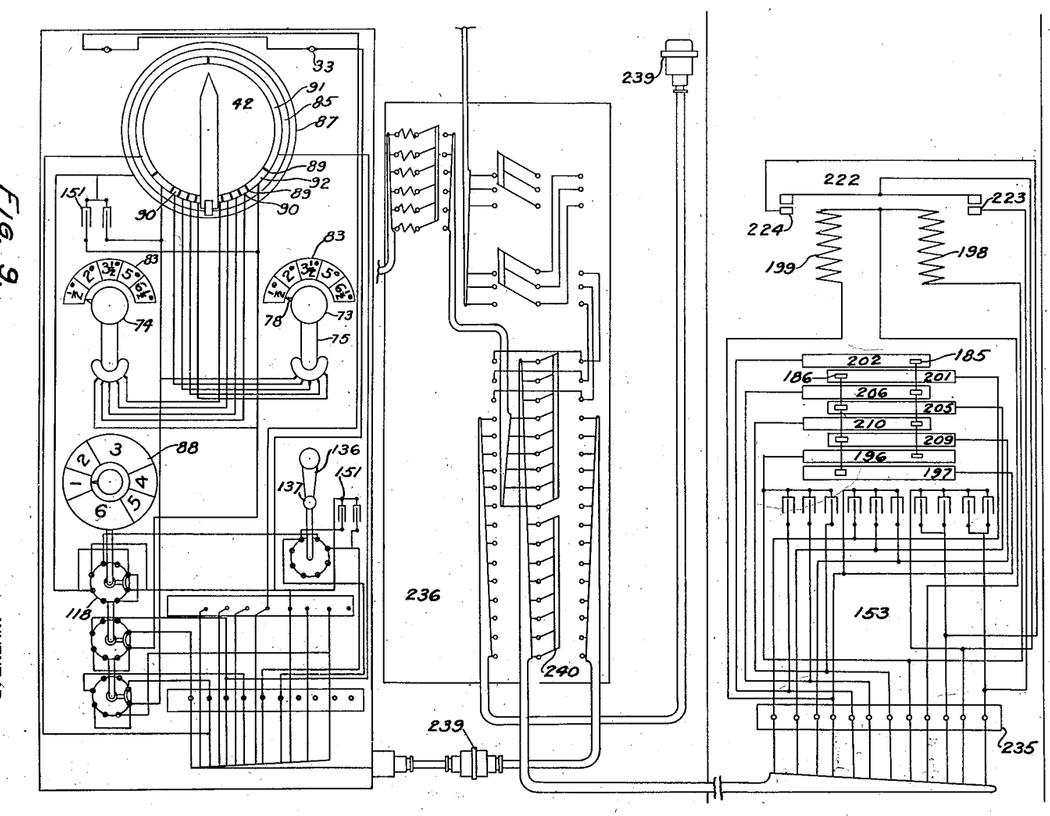
Figure 9 is a wiring diagram of my invention.

Referring more particularly to the drawings, 20 indicates a casing having a cover 21 removably secured thereto by nuts 22 threaded on dog-bolts 23 that fit into lugs 24 of the cover 21. A watertight fit is made between the cover 21 and casing 20 by having a tongue 25 extending from the cover 21 bear firmly against a rubber gasket 26 placed in a groove 27 machined in flanged edge 28, of the casing 20.

A conventional type repeater compass 29 is positioned in the upper portion of the casing 20 by means of plate 30 fastened by machine screws 31 to ears 32 that are integral parts of the casing 20. Positioned in casing 20 on both sides of the compass 29 are lubber lights 33. The compass 29 is provided with a compass card 34 and suitable operating mechanism encased in a cover 35. Extending from the cover 35, and protruding through casing 20, is a hand compass synchronizer that has a protective cap 37. An operating shaft 38 for card 34 has threaded into it a shaft extension 39. Secured to the card 34 by screws 40 is a gear 41 and mounted on the extension shaft 39 is a pointer 42 which bears against washer 43 placed on top of gear 41. The pointer 42 is held in place by a strong back or spring 44 and nut 45 on the extension shaft 39. Two gears, a driving intermediate gear 46 and a course setting gear 47, are sweated together and rotatably positioned on a shoulder 48 cut in the shaft 39 so that the shaft 39 acts as a hub for the said gears. To prevent displacement of the gears 46 and 47, a nut 49 is placed on the end of the shaft 39.

A support 50 secured to pointer 42 by screws 51 holds a shaft 52 that has one end extending through the upper part of the support 50 and the other end extending through the pointer 42. A gear 53 meshing with gear 46 is fastened adjacent the top of the support to the shaft and placed on one end of the shaft 52 is a knurled knob 54. On the under side of the pointer 42 the shaft 52 has affixed thereto a pinion 55 that meshes with gear 41 secured to card 34. A spring 56 is placed around shaft 52 to keep the gears meshed and to hold pinion 55 from dragging on the card 34.

Positioned by a bushing 57 threaded into an aperture 58 in the cover 21 is a shaft 59 that has on one end thereof a pinion 60 adapted to mesh with gear 47 and on the opposite end a knurled knob 61. A spring 62 placed around shaft 59 in a countersunk portion 63 of the bushing 57 bears against knob 61 thereby holding the shaft 59 in a raised position when there is no pressure on knob 61 so that pinion 60 will not mesh with gear 47 unless moved in place by pressing on the knob 61. A protective cap 241 for the knob 61 is threaded into the cover 21.

An upper terminal base 64 and a lower terminal base 65 are secured by studs 66 in the lower end of the casing 20. Each of the bases 64 and 65 are furnished with terminals 67 that have terminal screws 68, washers 69 and nuts 70. Over the upper base 64 and fastened to cover 21 by studs 71 and nuts 72 are a starboard yaw switch 73 and a port yaw switch 74. The switches 73 and 74 are provided with shafts 75 that extend through stuffing boxes 76 in the cover 21. On the upper end of the shaft 75 are handles 77 to which pointers or indicators 78 are secured by screws 79. The switches 73 and 74 are rotary contact switches and are provided with upper plates 80, lower plates 81 and contact plates 82.

Secured to the cover 21 around the stuffing boxes 76 for the switches 73 and 74 and in under the indicators 78 are indicating plates 83 that have marked thereon in degrees the amount of yaw allowed by the switches 73 and 74 before a corrective rudder is applied. The switches 73 and 74 are connected by wires directly to terminals 84 for segments on an inner ring 85 mounted around the compass card 34 on plate 30 by machine screws 86. Also mounted on plate 30 is a solid outer contact ring 87 that is reasonably spaced from inner ring 85 and directly connected with an engine selective switch 88. The inner ring 85 is divided into twelve segments which are insulated from each other as at 89. The central eight segments 90 are very narrow and are arranged to be cut out individually in order to permit the vessel to yaw through a definite angle to either side of the course before a corrective rudder is applied. The extreme segments 91 on either side of the ring 85 provide for the application of nine to fifteen degrees rudder. The segments 92 between the extreme segments 91 and the central small segments 90 on each side provide for the application of the same angle as do the narrow segments. This latter rudder angle is adjustable by means provided in a rudder angle limit panel hereinafter described.

The contact points on plates 82 for the switches 73 and 74 are held against displacement due to jar or ship movement by means of star wheels 95 mounted on the switch shafts 75 between the upper plates 80 and the cover 21, and clamps 93 adapted to bear against the periphery of the wheels 95. The clamps 93 comprise two arms 94 having rollers 100 in one end thereof and the other end 96 secured by means of studs 97 and spacers 98 to the plates 80. Springs 99 fastened to the two arms 94 of the clamps 93 hold rollers 100 between the radial projections of the wheels 92 so that the switches 73 and 74 can only be moved by manual operation of the shafts 75 through handles 77.

In order to determine the amount the vessel has deviated from its course the pointer 42 that rotates with the card 34 has secured to it by means of bolt 101, nut 102 and insulating material 103 a spring 104 to which is removably secured by pins 105 a roller housing 106. Inserted in the housing 106 are two threaded rollers 107 having a common axle 108. These rollers 107 are mounted parallel and adapted to rotate on the rings 85 and 86 thereby setting up a circuit between the two rings when the rollers are on any one of the segments of the inner ring 85. When the vessel is directly on its course the roller on the inner ring will rest on insulating material.

Positioned over terminal base 65 are the engine selective switch 88 and a manual control switch 109. The engine switch 88 is provided to make electrical connections under the following conditions: both engines ahead, starboard engine stopped, port engine stopped and manual control. The switch 88 is also secured to the cover 21 by studs 110 and nuts 111 and is similar in structure to switches 73 and 74. Switch 88 has a shaft 112 extending through a stuffing box 113 in the cover 21 and fastened to the upper end of the shaft is a handle 114 that has an indicator 115 secured thereto. Secured to the shaft 112 between an upper stationary plate 116 and a lower plate 117 are rotatable contact plates 118 adapted to make the proper electrical connections. The switch 88 is suitably connected by wires to the terminal bases 64 and 65 and the parts or apparatus to be controlled thereby. Positioned around the stuffing box 113 and secured to the cover 21 is an indicating plate 119 that designates the position of the switch.

The contact points on plates 118 of the switch 88 are held against displacement due to jar or ship movement by the same means that hold switches 73 and 74, that is, by a star wheel 120, positioned on the switch shaft 112 between the upper plate 116 and the cover 21, and clamp 121 adapted to bear against the periphery of the wheels 120. The clamp 121 comprises two arms 122 having rollers 123 in one end thereof, and the other end 124 secured by means of studs 125 and spacers 126 to the plate 116. A spring 127 is secured to the arms 122 to hold the rollers 123 between the radial projection of the wheel 120 so that the switch 88 can only be moved by manual operation of the shaft 112 through handle 114.

The manual control switch 109 has an upper plate 128 and lower plate 129 secured to the cover 21 by studs 130. A shaft 131 for contact plates 132 that are positioned between the upper plate 128 and lower plate 129, extends through a stuffing box 133 in the cover 21 and has secured to the upper end by nut 134 and lock washer 135 a steering lever 136 with knob 137. Fastened to the shaft 131 by pin 138 and flushed with the under side of the cover 21 is a lever 139. A spring 140 is placed around the shaft 131 between the lever 139 and plate 128. This spring 140 has long protruding ends 141 that bear against an arm 142 of the lever 139. A spring support or stop 143 having arm 144 is secured to the cover 21 so that when the switch 109 is moved by steering lever 139 one of the protruding ends 141 of the spring 140 bears against the arm 144 of stop 143 and the other end bears against the arm 142 of the lever 139 so that the switch 109 is always brought back to a neutral position by the spring 140 when there is no pressure on the knob 137.

Positioned in an aperture 146 in the cover 21 over the compass card 34 by means of a flange 147 extending into the aperture from the cover 21 and ring 148 secured to the cover 21 by screws 145 are two glass plates 149 forming a window for the compass. The plates 149 are made watertight and are suitably spaced from each other and from the flange 147 and the ring 148 by washers 150. Condensers 151 are fastened to the casing 20 by means of screws 152 and strap 253. These condensers 151 are utilized to absorb the arcs caused in the making and breaking of circuits in the steersman.

A rudder angle limit panel 153 controls the amount of corrective rudder which will be applied when the vessel or dirigible moves off the course set. The operation of this panel is in effect that of a limit switch and must be mechanically operated by movement of the rudder of the vessel or dirigible. The panel 153 has a base or frame 154 having bearings 155 on its four corners and rotatably fitted into said bearings 155 are an upper lead screw 157 and a lower lead screw 158. The lead screws 157 and 158 have drive gears 159 and 160 respectively secured to one end thereof by nuts 161, pins 162 and washers 163 and on the opposite end are collars 164 secured by pins 165. The gears 159 and 160 mesh with an idler gear 166 that is mounted for rotation on a shaft or pin 167 fitted in and secured by pin 156 to an arm 168 projecting from the frame 153. A collar 169 placed on the end of pin 167 holds gear 166 against outward displacement. The gear 160 meshes with a rudder angle indicator shaft gear 170 that is a part of the conventional type electrical steering apparatus. Threaded on screw 157 is a traveling nut 171 and on lead screw 158 is traveling nut 172. A roller carriage 173 is secured to the traveling nut 171 by stud 174, nut 175 and lock washer 176. The carriage 173 is also adjustably secured to stud 177 of the traveling nut 172 by means of nut 178, washer 179 and a bearing plate 180. A set of supporting arms 181 are secured by screws 182 to both sides of the carriage 173 and threaded into the supports are screws 183 having lock nuts 184. The screws 183 bear against plate 180 so as to locate the carriage 173 in relation to stud 177 of the traveling nut 172.

Four rollers 185 electrically connected together and known as right rollers and four rollers 186 electrically connected together and known as left rollers are mounted to the carriage 173 by means of springs 187 around supports 188 that are secured to the carriage 173 by lock nuts 189. The rollers 185 and 186 are adapted to move over four pairs of contact bars movably positioned on a panel 190 by means of studs 191 extending through slotted openings 192 in the panel 190, and washers 193, springs 194 and nuts 195 secured to the ends of the studs 191 extending from the panel 190. The bottom two contact bars 196 and 197 are connected to a right coil 198 and left coil 199 of a steering relay 200 and are always in the circuit in series with one or another pair of the other six contact bars depending upon the engine conditions for which the steersman is set. Only one pair of the other six contact bars are connected in the control circuit at a time. The first pair are for steering when both engines are running and contact bars 201 and 202 of this pair permit the application of equal amounts of right or left rudder. The two bars 201 and 202 are adjustable for rudder angles between zero degree to eight degrees rudder either side as indicated on plates 203 mounted on the panel 190 by pointers 204 secured to the ends of bars 201 and 202.

The second pair are for steering when operating with the port engine stopped and contact bars 205 and 206 of this pair permit greater right rudder angle than left rudder angle. These two bars 205 and 206 are adjustable for rudder angles between zero degree to three degrees left rudder and nine degrees to fifteen degrees right rudder as indicated on plates 207 mounted on panel 190 by pointers 208 secured to bars 205 and 206.

The third pair are for steering when operating with the starboard engine stopped and the contact bars 209 and 210 of this pair permit greater left rudder angles than right rudder angles. These two bars 209 and 210 are adjustable for rudder angles between zero degree to three degrees right rudder and nine degrees to fifteen degrees left rudder as indicated on plate 211 mounted on panel 190 by pointers 212 attached to the bars 209 and 210. The last pair of contact bars are 196 and 197 that are connected to the right and left coil of the steering rudder relay 200. A name plate 213 scaled in degrees is mounted on the frame 154 and, to show the amount of rudder applied, a pointer 214 adapted to pass over plate 213 is secured to the carriage 173.

The pair of contact bars in the circuit at any one time is controlled by the engine selective switch 88 mounted on the face of the steersman. When the engine selective switch 88 is turned to the position marked manual control the contacts of the control switch 88 of the steersman are connected directly to contact bars 198 and 199 of the rudder angle limit panel. Movement of the manual control switch 109 to the right or left then applies the corresponding rudder.

In order to compensate, when operating on one propeller, for the tendency of the bow of the ship to swing toward the other side, the contact bars may be so adjusted that the rudder will never swing across the midship line when moving from the side of the propeller in operation. To make adjustments of the contact bars adjustable studs 215 are threaded in eyes 216 secured to both ends of the frame 154. The studs 215 have in one end thereof grooves 217 that are inserted in slots 218 of the pointers 204, 208 and 212 for the bars 201 and 202, 205 and 206, 209 and 210 respectively so that movement of the studs 215 will move the bars back and forth within the limits of the slotted openings 192 in the panel 190. The setting of the pointers on any contact bar with respect to the scale over which the pointers move indicates the rudder angle to which the rudder will come to rest when the rudder angle is being controlled by that contact bar.

The relay coil 200 is secured by means of supporting strap 219 and studs 220 to the frame 154. Beside the right coil 198 and left coil 199 the relay is provided with an armature 221 that has affixed thereto contact springs 222 adapted to set up contact with the right terminal 223 and left terminal 224 for the control switches of the rudder steering apparatus. A spring 225 is secured to the relay armature 221 and is held in position by lock nuts 226 on screws 227 that are threaded into supporting arms 228 of a plate 229 secured to the relay casing. The relay is provided on its under side with operating terminals 230.

Condensers 231 are strapped to the bottom of the frame 154 by a ban 232 and studs 233 and nuts 252. These condensers absorb the arcs as the circuits are made and broken in the panel and relay. Secured to band 232 by screws 234 is a terminal plate 235 having connections between the condensers and relay and between the panel 153 and a transfer panel 236. Suitably positioned at points on the frame 154 for the moving parts of the panel 153 are grease fittings 237.

The transfer or cutout panel 236 is suitably located for making connections between the steersmen, the rudder angle limit panel, master compass and various steering apparati of the vessel or dirigible. The steersman is portable and can be inserted by means of a cable extending through a stuffing box 238, an integral part of the casing 20, in plugs 239 situated at various parts of the vessel or dirigible. The plugs 239 all have leads to the panel 236 and are connected to the rudder angle limit panel 153 by switches 240.

Although I have used certain definite values in degrees throughout the specification, I desire it to be understood that these values may be varied accordingly.

In the practical use of my improved device, the steersman is mounted in a convenient location in the vessel or dirigible. The rudder angle limit panel 153 is fitted with a gear drive 170 which is mechanically operated by movement of the rudder. The mechanical transmission between the rudder and the rudder angle limit panel 153 must be designed to suit the actual steering arrangements in the vessel in which the steersman is to be installed. In some vessels having a mechanically operated rudder angle indicator as standard equipment, arrangements may be provided for driving the rudder angle limit panel from the shaft which operates the rudder angle limit panel. In vessels or dirigibles that are not equipped with a rudder angle indicator, the rudder angle limit panel 153 must be located in the immediate vicinity of the steering gear and operated by a mechanical connection to the steering gear.

To make my device ready for operation, the proper switches on the transfer panel 236 are closed, the engine selective switch 88 is then turned to "manual steering" and the repeater compass is synchronized with the master compass. To steer automatically, the cap 241 is removed from the course setting device and knob 61 is pressed down and turned whereby pinion 60 meshing with course setting gear 47, and intermediate gear 46 meshing with gear 53 turns shaft 52 mounted on the pointer 42 so that pinion 55 will rotate around gear 41 thereby setting the pointer 42 on the desired course. The torque set up in the repeater compass when the same is synchronized with the master compass, holds card 34 from turning with pointer 42. The engine selective switch 88 is then turned to the proper position depending upon the engine conditions, that is, both engines ahead, starboard engine stopped or port engine stopped. The yaw switches 73 and 74 are also set according to the amount of yaw desired to the port and starboard sides. To change the course when steering automatically, it is only necessary to reset the pointer 42 by turning the knob 61.

To change from automatic steering to manual control the engine selective switch is turned to the position marked "manual control," at which point the rudder can be controlled directly by movement of the manual control switch 109. In shifting from steering by the steersman to steering by the regular steering stations, the switches on panel 236 for the steersman are cut out and the switches for the regular steering stations are closed.

Thus, suppose a course of 180 degrees is desired, the pointer 42 is moved by knob 61 of the course setting device until it points to 180 degrees on the compass card 34. If both engines are running, the engine selective switch 88 is turned to "both engines ahead". As long as the vessel remains on the course, the rudder will not be moved, as the double roller 107 mounted on the after end of pointer 42 is on insulating material 89 that divides the right and left segments 90 on ring 85. As soon as the vessel moves off the course one half degree or more, as set by the yaw switches 73 and 74, the pointer 42 which moves with the compass card 34 will move the rollers 107 from the insulation 89 and a current will then flow from the outer ring 87 through the rollers 107 to one of the segments 90 or 92 to the right coil 198 or left coil 199 of the relay 200, thereby energizing one of said coils which in turn causes the right or left steering motor contactors, not shown, to close so that corrective rudder is applied to bring the vessel or dirigible back to the set course.

The rudder angle limit panel 153 permits steering rudder relay 200 to remain closed until a predetermined amount of right or left rudder is applied and the control circuit is broken by the rollers 185 and 186. As the vessel or dirigible swings back to its course, the original corrective rudder remains applied. Then as the vessel swings across her course, the pointer 42 with rollers 107 makes contact with the opposite rudder segments 90 or 92 and the rudder is then moved to the opposite side to meet the course set. In effect the corrective rudder causes the vessel or dirigible to hunt down to and maintain the course as indicated by the pointer 42.

When operating on one propeller only, the operation of the steersman varies from its operation when using both propellers only in the fact that a different pair of contact bars on panel 153 are used to control the amount of corrective rudder that is applied to either the port or starboard sides.

It will be understood that the above description and accompanying drawings comprehend only the general and preferred embodiment of my invention, and that various changes in construction, proportion and arrangement of parts may be made within the scope of the appended claims, and without sacrificing any of the advantages of my invention.

The herein described invention may be manufactured and used by or for the Government of the United States for governmental purposes without the payment to me of any royalties thereon.

What I claim is:

1. In combination with a vessel an automatic steersman having a compass, means for setting a course on said compass, means for applying a corrective rudder when the vessel moves off the set course, means permitting definite angles of yaw before a corrective rudder is applied, and means connected with said course setting means, yaw means, and rudder correcting means for controlling the same under varying conditions.

2. In combination with a vessel, an automatic steersman having a compass, means for setting a course for the vessel on said compass, means for applying a corrective rudder when the vessel moves off of the set course, means to set a definite angle of starboard yaw, and means to set a definite angle of port yaw of the vessel before a corrective rudder is applied, means for applying full rudder when the course setting means is moved beyond either the port or starboard yaw setting means.

3. In combination with a vessel, an automatic steersman having a repeater compass, means for setting a course for the vessel on said compass, means for applying a corrective rudder when the vessel moves off of the set course, means permitting a definite angle of starboard yaw and means permitting a definite angle of port yaw before a corrective rudder is applied, and means connected with said course setting means, rudder correcting means, starboard and port yaw means for controlling the same under varying engine conditions of the vessel.

4. In combination with a vessel, an automatic steersman having a repeater compass, means for setting a course for the vessel on said compass, a rudder angle limit means to apply a corrective rudder for said vessel, means setting up a circuit in said angle limit means when the vessel deviates from the set course, and a control means connected to said angle limit means for regulating said limit means under varying engine conditions of the vessel.

5. In combination with a vessel, a repeater compass and an automatic steersman comprising a means for setting a course on said compass, means around said compass for setting up a circuit when the vessel deviates from the set course, a port yaw switch and a starboard yaw switch connected with said circuit means for permitting a definite amount of port or starboard yaw of the vessel before a circuit is set up, a manual control means, and a control switch connected to said port and starboard switches, to said circuit means and to said manual control means for regulating the same and to control the said yaw switches and the said circuit means under varying engine conditions of the vessel.

6. In an automatic steersman, a repeater compass, a pointer for setting a course on said compass and for showing deviations on the compass from the course set, means for setting said pointer, an inner segmented ring around said compass, a solid outer ring around said compass, a port yaw switch and a starboard yaw switch connected to said segmented ring permitting definite angles of yaw and means secured to said pointer for setting up a circuit between said rings when the pointer shows a deviation, beyond the angles of yaw, from the course set.

7. In an automatic steersman, a repeater compass, a pointer for setting a course on said compass and for showing deviations on the compass from the course set, means for setting said pointer, an inner segmented ring around said compass, a solid outer ring around said compass, a port yaw switch and a starboard yaw switch connected to said segmented ring permitting definite angles of yaw, means secured to said pointer for setting up a circuit between said rings when the pointer shows a deviation, beyond the angles of yaw, from the course set, and a control switch connected to said rings.

8. In combination with a vessel, an automatic steersman having a repeater compass, a course setting pointer secured to said compass and adapted to show deviations from a set course, means for setting said pointer, a segmented ring and a solid ring mounted around said compass, a port yaw switch connected to said segmented ring, a starboard yaw switch connected to the segmented ring, means secured to said pointer for setting up a circuit between said rings when the pointer shows a deviation from the course set beyond angles of yaw set by said port and starboard yaw switches, an engine selective switch connected to said rings for controlling the steersman under varying engine conditions, and a manual steering switch connected with said engine selective switch.

9. In combination with a vessel, an automatic steersman having a repeater compass, a course setting pointer secured to said compass and adapted to show deviations from a set course, means for setting said pointer, a segmented ring and a solid ring mounted around said compass, a port yaw switch connected to said segmented ring, a starboard yaw switch connected to the segmented ring, means secured to said pointer for setting up a circuit between said rings when the pointer shows a deviation from the course set beyond angles of yaw set by said port and starboard yaw switches, an engine selective switch connected to said rings for controlling the steersman under varying engine conditions, a manual steering switch connected with said engine selective switch, and a rudder angle limit panel connected with said engine switch for limiting the amount of corrective rudder applied.

10. In a rudder angle limit panel comprising a base, four pairs of adjustable contact bars mounted on said base, a relay coil connected with one pair of said bars, and means to move over said bars whereby one or another pair of the other six contact bars are in circuit in series with the said pair of bars connected to the relay.

11. In a rudder angle limit panel comprising a base, four pairs of contact bars mounted on said base, means for adjusting said bars, a steering relay having a right coil connected to one of a pair of said bars and a left coil connected to the other bar of said pair of contact bars, means to move over said bars whereby one or another pair of the other six bars are in circuit in series with the pair of bars connected to the steering relay, and means for actuating said moving contact means.

12. In a rudder angle limit panel comprising a base, four pairs of contact bars mounted on said base, means for adjusting said bars, a steering relay having a right coil connected to one of a pair of said bars and a left coil connected to the other bar of said pair of contact bars, a roller carriage having multiple contact rollers to move over said contact bars whereby one pair of the remaining six bars is in circuit in series with the pair of bars connected to the steering relay, and means moving said carriage over the contact bars.

13. In a rudder angle limit panel comprising a base, four pairs of contact bars mounted on said base, means for adjusting said bars, a steering relay having a right coil connected to one of a pair of said bars and a left coil connected to the other bar of said pair of contact bars, a roller carriage having multiple contact rollers to move over said contact bars whereby one pair of the remaining six bars is in circuit in series with the pair of bars connected to the steering relay, and lead screws having gears on the ends thereof, adapted to move said carriage over the contact bars.

14. In combination with a vessel, a rudder angle limit panel comprising a base, four pairs of adjustable contact bars mounted on said base, a steering relay connected with one pair of said bars, means to move over said bars whereby one or another pair of the other six contact bars are in circuit in series with the pair of bars connected to the relay, and an automatic steersman having means for regulating said contact bars depending upon the engine conditions of the vessel.

15. In combination with a vessel, an automatic steersman having a repeater compass, a course setting pointer secured to said compass and adapted to show deviations from a set course, means for setting said pointer, a segmented ring and a solid ring mounted around said compass, a port yaw switch connected to said segmented ring, a starboard yaw switch connected to the segmented ring, means secured to said pointer for setting up a circuit between said rings when the pointer shows a deviation from the course set beyond angles of yaw set by said port and starboard yaw switches, an engine selective switch connected to said rings for controlling the steersman under varying engine conditions, a manual steering switch connected with said engine selective switch, and a rudder angle limit panel connected with said engine switch for limiting the amount of corrective rudder applied, said panel comprising a base, adjustable contact bars mounted on said base, and contact means adapted to move over said bars.

16. In combination with a dirigible, an automatic steersman having a repeater compass, means for setting a course for the dirigible on said compass, a rudder angle limit means adapted to regulate the corrective rudder applied to said dirigible, means setting up a circuit in said angle limit means when the vessel deviates from the set course, and a control means connected to said angle limit means for controlling said limit means under varying engine conditions of the dirigible.

17. In combination with a dirigible, a rudder angle limit panel comprising a base, adjustable contact bars mounted on said base, contact means adapted to move over said contact bars to regulate the corrective rudder applied to said dirigible, and an automatic steersman having a compass, means for setting a course on said compass, means registering deviations from the set course, and control means for controlling said rudder angle limit panel under varying engine conditions of said dirigible.

18. In combination with a dirigible, an automatic steersman having a repeater compass, means for setting a course on said compass, means for applying a corrective rudder when the dirigible moves off the set course, means permitting a definite angle of yaw before a corrective rudder is applied, and a control switch connected to said course setting means, yaw means and rudder correcting means for controlling the same under varying engine conditions of the dirigible.

19. In an automatic steersman, a compass means for setting a course on said compass, means to set an angle of deviation to the right of the course set, independent means to set an angle of deviation to the left of the course set, and means for automatically applying a corrective rudder at deviations from the course set equal to or greater than the angles set by said right and left deviating angle setting means, and means for applying a large amount of rudder when the course setting means is moved through an angle greater than the largest angle on either the right or left angle deviation setting means.

20. In an automatic steersman for a vessel or air craft comprising a compass, means for setting a course on said compass, means for automatically applying a corrective rudder, means for setting up and varying the angle through which the vessel or aircraft may deviate to the right from the course set before corrective rudder is automatically applied and corresponding and independent means for setting up and varying the angle through which the vessel or dirigible may deviate to the left from the course set before corrective rudder is automatically applied, and means for applying a large amount of rudder when the course setting means is moved through an angle greater than the largest angle on either the right or left angle deviation setting means.

21. In an automatic steersman for a vessel or aircraft comprising a compass, means for setting a course on said compass and registering deviations from the course set, means for correcting deviations from the course set, and means connected with said course setting means and said deviation correcting means for controlling the same under varying conditions of the propeller or propellers of the vessel or aircraft.

22. In an automatic steersman, a compass, means for setting a course on said compass and registering deviations from the course set, means permitting angles of yaw connected with said course setting means, means correcting deviations from the set course beyond the limits of the angles set by said yaw means, and means for applying a large rudder angle when the course setting means is moved beyond the yaw angle means.

23. In an automatic steersman for a vessel or aircraft comprising a compass, means for setting a course on said compass and registering deviations from the course set, means for applying a corrective rudder, means for setting up and varying the angle through which the vessel or aircraft may deviate from the course set before corrective rudder is applied, and means for applying a large rudder angle when the course setting means is moved through an angle greater than the largest angle on the angle deviation setting means.

24. In a automatic steersman for a vessel or aircraft comprising a compass, means for setting a course on said compass and registering deviations from the course set, means for applying a corrective rudder, means for setting up and varying the angle through which the vessel or aircraft may deviate from the course set before corrective rudder is applied, means for applying a large rudder angle when the course setting means is moved through an angle greater than the largest angle on the angle deviation setting means, and means controlling said rudder applying means under varying operating conditions of the propeller or propellers of the vessel or aircraft.

HYDE A. HARMAN.